(12) United States Patent
Jennings et al.

(10) Patent No.: US 6,807,175 B1
(45) Date of Patent: Oct. 19, 2004

(54) DISTRIBUTED MULTICAST ROUTING IN PACKET-BASED COMMUNICATION NETWORK DEVICES

(75) Inventors: Kevin Jennings, Dublin (IE); Jerome Nolan, Dublin (IE); David Nolan, Celebridge (IE); Michael J Gleeson, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 778 days.

(21) Appl. No.: 09/645,569

(22) Filed: Aug. 25, 2000

(30) Foreign Application Priority Data

May 10, 2000 (GB) .............................................. 0011239

(51) Int. Cl.[7] .............................................. H04L 12/56
(52) U.S. Cl. ..................... 370/390; 370/392; 370/401
(58) Field of Search ................................ 370/404, 405, 370/401, 218, 432, 390, 392, 381, 389

(56) References Cited

U.S. PATENT DOCUMENTS

| | | | |
|---|---|---|---|
| 4,780,889 A | | 10/1988 | Ley et al. |
| 5,550,860 A | | 8/1996 | Georgiou et al. |
| 5,642,386 A | | 6/1997 | Rocco, Jr. |
| 5,757,297 A | | 5/1998 | Ferraiolo et al. |
| 5,950,115 A | | 9/1999 | Momtaz et al. |
| 5,970,103 A | | 10/1999 | Townshend |
| 6,115,379 A | * | 9/2000 | Flanders et al. ............ 370/392 |
| 6,553,028 B1 | * | 4/2003 | Tang et al. .................. 370/389 |
| 2002/0101867 A1 | * | 8/2002 | O'Callaghan et al. ...... 370/389 |
| 2002/0186694 A1 | * | 12/2002 | Mahajan et al. ............ 370/390 |

FOREIGN PATENT DOCUMENTS

| | | |
|---|---|---|
| EP | 0 153 107 | 8/1985 |
| EP | 0 365 337 | 4/1990 |
| EP | 0 424 741 | 5/1991 |
| EP | 0 465 201 | 1/1992 |
| EP | 0 508 886 | 10/1992 |
| EP | 0 841 782 | 5/1998 |
| GB | 2 283 645 | 5/1995 |
| GB | 2 336 075 | 10/1999 |
| GB | 2 337 674 | 11/1999 |
| GB | 2 343 816 | 5/2000 |
| GB | 2 344 030 | 5/2000 |
| GB | 2362289 A | * 11/2001 |
| WO | WO 96/34474 | 10/1996 |

OTHER PUBLICATIONS

Copending Application No. 09/286,470 filed Apr. 6, 1999.
Copending Application No. 09/253,538 filed Feb. 22, 1999.
Copending Application No. 09/417,102 filed Oct. 13, 1999.
WPI Abstract Accession No. 97–269820/1997 & JP090098171 (Hitachi) Aug. 4, 1997.
WPI Abstract Accession No. 93–390998/1993 & JP05292091 (Mitsubishi Electric) May 11, 1993.

* cited by examiner

*Primary Examiner*—Melvin Marcelo
(74) *Attorney, Agent, or Firm*—Nixon & Vanderhye P.C.

(57) ABSTRACT

A network router has a distributed processing scheme for multicast packets. The router has a look-up and forwarding engine operative in response to the reception of an internet protocol multicast packet to direct the packet to a multiplicity of transmit ports which may or may not be connected to the source network segment from which the multicast packet was received by the router. Each transmit port is associated with a predetermined default network segment and the engine directs the packet to the ports (e.g. across the router's backplane) with an identification of the source network segment and control flags which enable processing means associated with the ports to determine by comparison of the respective network segment and the source network segment whether the packet is bridged from the respective port or routed, with relevant modification of the packet, from that port. The control flags comprises a first flag which can be set to allow the relevant modification and a second flag which can be set to allow the comparison between the source segment and the predetermined default segment.

19 Claims, 8 Drawing Sheets

| ipModify | SendToPvid | Transmit side action |
|---|---|---|
| 0 | 0 | Packet should be bridged. |
| 0 | 1 | The packet will be bridged on to the default vlan Id for the port. This mode is used for brouting "non-IP" multicast traffic. |
| 1 | 0 | The packet should be routed on to the destination vlanId supplied by the lookup engine. This mode is used for routing IP unicast traffic. |
| 1 | 1 | Transmit side must decide if the packet should be routed or bridged. If the packet is routed it will be routed onto the default vlan Id for the port. This mode is used for routing IP multicast traffic. |

FIG.6

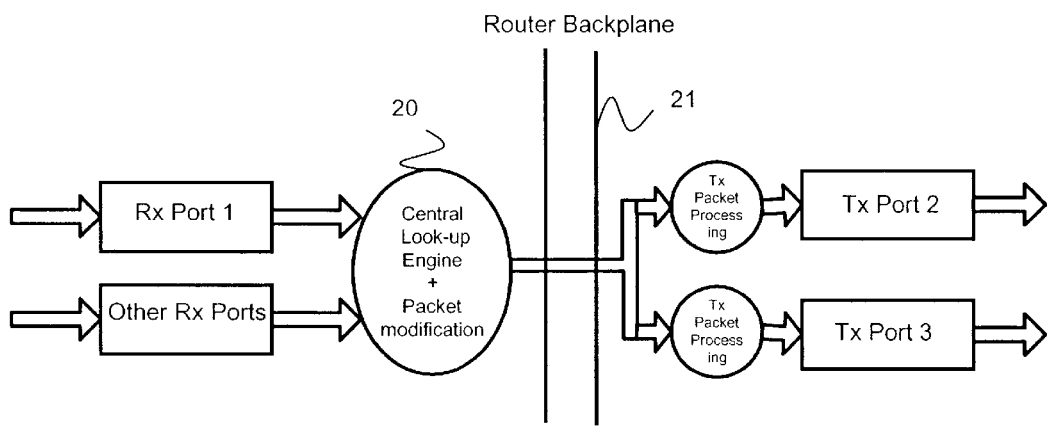

FIG.4

| Bridge | Exception | Broute | Route | IP MC | TTLEq One | AD BridgeOnly | ADSend ToPVID | SrcVID =destVID | Bridge Frame Only | IPModify | Send ToPVID |
|---|---|---|---|---|---|---|---|---|---|---|---|
| 1 | 0 | 0 | 0 | 0 | 0 | 0 | 0 | 0 | 0 | 0 | 0 |
|   |   |   |   |   | 0 | 0 | 0 | 1 | 0 | 0 | 0 |
|   |   |   |   |   | 0 | 0 | 1 | 0 | 0 | 0 | 0 |
|   |   |   |   |   | 0 | 0 | 1 | 1 | 0 | 0 | 0 |
|   |   |   |   |   | 0 | 1 | 0 | 0 | 1 | 0 | 0 |
|   |   |   |   |   | 0 | 1 | 0 | 1 | 1 | 0 | 0 |
|   |   |   |   |   | 0 | 1 | 1 | 0 | 1 | 0 | 0 |
|   |   |   |   |   | 0 | 1 | 1 | 1 | 1 | 0 | 0 |
| 0 | 1 | 0 | 0 | 0 | 0 | 0 | 0 | 0 | 0 | 0 | 0 |
|   |   |   |   |   | 0 | 0 | 0 | 1 | 0 | 0 | 0 |
|   |   |   |   |   | 0 | 0 | 1 | 0 | 0 | 0 | 0 |
|   |   |   |   |   | 0 | 0 | 1 | 1 | 0 | 0 | 0 |
|   |   |   |   |   | 0 | 1 | 0 | 0 | 1 | 0 | 0 |
|   |   |   |   |   | 0 | 1 | 0 | 1 | 1 | 0 | 0 |
|   |   |   |   |   | 0 | 1 | 1 | 0 | 1 | 0 | 0 |
|   |   |   |   |   | 0 | 1 | 1 | 1 | 1 | 0 | 0 |
| 0 | 0 | 1 | 0 | 0 | 0 | 0 | 0 | 0 | 0 | 0 | 0 |
|   |   |   |   |   | 0 | 0 | 0 | 1 | 0 | 0 | 0 |
|   |   |   |   |   | 0 | 0 | 1 | 0 | 0 | 0 | 1 |
|   |   |   |   |   | 0 | 0 | 1 | 1 | 0 | 0 | 1 |
|   |   |   |   |   | 0 | 1 | 0 | 0 | 1 | 0 | 0 |
|   |   |   |   |   | 0 | 1 | 0 | 1 | 1 | 0 | 0 |
|   |   |   |   |   | 0 | 1 | 1 | 0 | 1 | 0 | 1 |
|   |   |   |   |   | 0 | 1 | 1 | 1 | 1 | 0 | 1 |
| 0 | 0 | 0 | 1 | 0 | 0 | 0 | 0 | 0 | 0 | 1 | 0 |
|   |   |   |   |   | 0 | 0 | 0 | 1 | 0 | 1 | 0 |
|   |   |   |   |   | 0 | 0 | 1 | 0 | 0 | 1 | 0 |
|   |   |   |   |   | 0 | 0 | 1 | 1 | 0 | 1 | 0 |
|   |   |   |   |   | 0 | 1 | 0 | 0 | 1 | 0 | 0 |
|   |   |   |   |   | 0 | 1 | 0 | 1 | 1 | 0 | 0 |
|   |   |   |   |   | 0 | 1 | 1 | 0 | 1 | 0 | 0 |
|   |   |   |   |   | 0 | 1 | 1 | 1 | 1 | 0 | 0 |
| 0 | 0 | 0 | 1 | 1 | 0 | 0 | 0 | 0 | 0 | 1 | 0 |
|   |   |   |   |   | 0 | 0 | 0 | 1 | 0 | 0 | 0 |
|   |   |   |   |   | 0 | 0 | 1 | 0 | 0 | 1 | 1 |
|   |   |   |   |   | 0 | 0 | 1 | 1 | 0 | 1 | 1 |
|   |   |   |   |   | 0 | 1 | 0 | 0 | 1 | 0 | 0 |
|   |   |   |   |   | 0 | 1 | 0 | 1 | 1 | 0 | 0 |
|   |   |   |   |   | 0 | 1 | 1 | 0 | 1 | 0 | 0 |
|   |   |   |   |   | 0 | 1 | 1 | 1 | 1 | 0 | 0 |
|   |   |   |   |   | 1 | 0 | 0 | 0 | 1 | 0 | 0 |
|   |   |   |   |   | 1 | 0 | 0 | 1 | 1 | 0 | 0 |
|   |   |   |   |   | 1 | 0 | 1 | 0 | 1 | 0 | 0 |
|   |   |   |   |   | 1 | 0 | 1 | 1 | 1 | 0 | 0 |
|   |   |   |   |   | 1 | 1 | 0 | 0 | 1 | 0 | 0 |
|   |   |   |   |   | 1 | 1 | 0 | 1 | 1 | 0 | 0 |
|   |   |   |   |   | 1 | 1 | 1 | 0 | 1 | 0 | 0 |
|   |   |   |   |   | 1 | 1 | 1 | 1 | 1 | 0 | 0 |

FIG.10

DISTRIBUTED MULTICAST ROUTING IN PACKET-BASED COMMUNICATION NETWORK DEVICES

FIELD OF THE INVENTION

This invention generally relates to packet-based data communication networks in which data is transmitted by means of packets which include media access control (MAC) addresses and protocol (IP) address data. The invention relates to an improved manner of organising a device which needs to perform both routing and bridging of internet protocol multicast packets.

BACKGROUND TO THE INVENTION

Two well known operations in multi-port network devices which selectively direct received packets to destinations defined by address data within the packets are 'bridging' and 'routing'. 'Bridging' is a switching action performed in response to media access control address data within a packet and in essence occurs within the same local area network or the same segment or subnet if, as is common, a network is partitioned into segments, e.g. into 'virtual local area networks'. 'Routing' is normally performed in response to 'network' or 'protocol' address data often called IP address data, and is an action which, though performed in an analogous manner to bridging, requires modification of a packet and particularly a change in its 'source' MAC address and consequential modification. Customarily, routers have additional capabilities, such as the ability to select a route to an ultimate destination amongst a multiplicity of possibilities, for example by means of an 'RIP' or 'OSPF' routing protocol. However, as far as the present invention is concerned it is the switching aspect of bridging and routing which is of primary concern.

If a device, such as for example described in GB patent 2337674, which is capable of bridging and routing receives a 'multicast' packet, specifying in effect a multiplicity of destinations of which at least one is in the same network segment hereinafter called for convenience virtual local area network as the source device and another destination is in a different virtual local area network the forwarding engine in the device will according to current practice need both to bridge and to route the packet it will bridge the packet to the first destination and route the packet to the second destination. It is not necessary for the segments or VLANs to be mutually exclusive.

In general, a central look-up and forwarding engine is coupled to the 'transmit' ports of a device by means of a backplanes a system of buses by means of which the packets are retrieved from memory and sent to the respective 'transmit' ports under the control of instructions obtained from the forwarding engine. Where a packet is both bridged and routed, it will inevitably be transmitted from different ports and accordingly the packet normally has to be forwarded a corresponding number of times across the backplane.

The invention is particularly relevant to devices which are composed of a multiplicity of large scale integrated circuits each of which has a look-up and forwarding engine and a respective set of 'local' ports. In such a device the individual integrated circuits or 'chips' are connected by high speed links (described for example in the published patent applications GB-2336075 and GB 2344030). Thus packets received by one chip but not intended for forwarding exclusively to the ports associated with that device can be forwarded across the links to other chips and on to their intended ports. For a construction such as this it is also desirable to minimise the number of times any version of the same packet needs to be sent across the links which may be regarded as constituting a backplane, between the various chips in the device.

SUMMARY OF THE INVENTION

The present invention is based on a distribution of the routing process between a look-up and forwarding engine and the individual processing circuits for transmit ports so that the look-up engine will make the decision on which ports the packet needs to be forwarded whereas, in effect, each transmit port will individually decide whether the packet is routed or bridged from that particular port. Thus the processing which would be performed on a packet that needs to be both routed and bridged is largely removed from the central engine and transferred to the processing circuits associated with transmit ports. Such a reorganisation and redistribution of the routing decision process may minimise or at least substantially lessen the unnecessary occupancy of a backplane or its equivalent by multicast traffic.

As will be explained in detail, the preferred form of the present invention relies on the use of to control flags and the assignment of a default network segment (e.g. VLAN) to each port to determine the processing that has to be performed on a packet by a transmit processor.

Further features of the invention and a fuller explanation of it are set out in the following description of a specific example, with reference to the accompanying drawings.

BRIEF DESCRIPTION OF THE DRAWINGS

FIG. 4 is a schematic explanation of the basis of the invention.

FIG. 6 is a table of control flags and their significance.

FIG. 10 is a table explaining the generation of the control flags.

DETAILED DESCRIPTION OF A PREFERRED EXAMPLE

Figure 1:
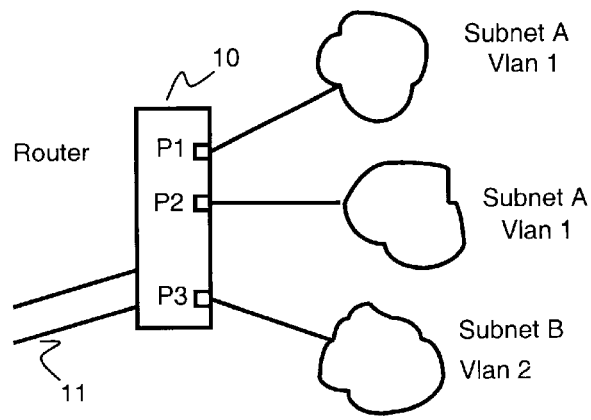
FIG. 1 is an explanatory diagram illustrating a router and a plurality of VLANs.

FIG. 1 of the drawings illustrates in basic form a router 10 which has a connection 11 to other devices and, among what is normally a greater multiplicity of ports, three ports P1, P2 and P3 Port P1 is connected to part of a subnet A (VLAN 1). Port P2 is connected to another part of the same subnet A (VLAN 1) and port P3 is connected to a different subnet B (VLAN 2).

It will be assumed in this description that the packets which are used in the system are for example. 'Ethernet' packets which have a destination MAC address field (48 bits), a source MAC address field (48 bits), a VLAN identifying field, protocol (IP) address fields and an IP checksum field, message data fields and a CRC (cyclic redundancy check) field, which is normally a 32 bit field computed by dividing the previous fields by some suitable polynomial and setting the CRC field in accordance with the remainder of the division process. Such packets are well known in the art and do not need any further description.

For the purpose of the present explanation it may be assumed that port P1 receives from subnet A a multicast packet The central look-up and forwarding engine forwards the packet to each port in turn in accordance with the multiplicity of addresses indicated by the multicast packet. It may be further assumed for the sake of example that the central engine will forward the packet received at port P1 both to port P2 and to port P3. Since port P2 is on the same subnet or VLAN as is port P1, the packet will be 'bridged' that is to say sent without modification to port 2. As far as port 3 is concerned, since it is on a different subnet to port P1, the forwarding engine needs to modify the packet to provide it with a new source MAC address and, usually, to make some conventional and consequential modifications, more particularly according to current conventions decrementing a 'time to live' (TTL) value in the packet's header by unity and recomputing the check sum.

Figure 2:
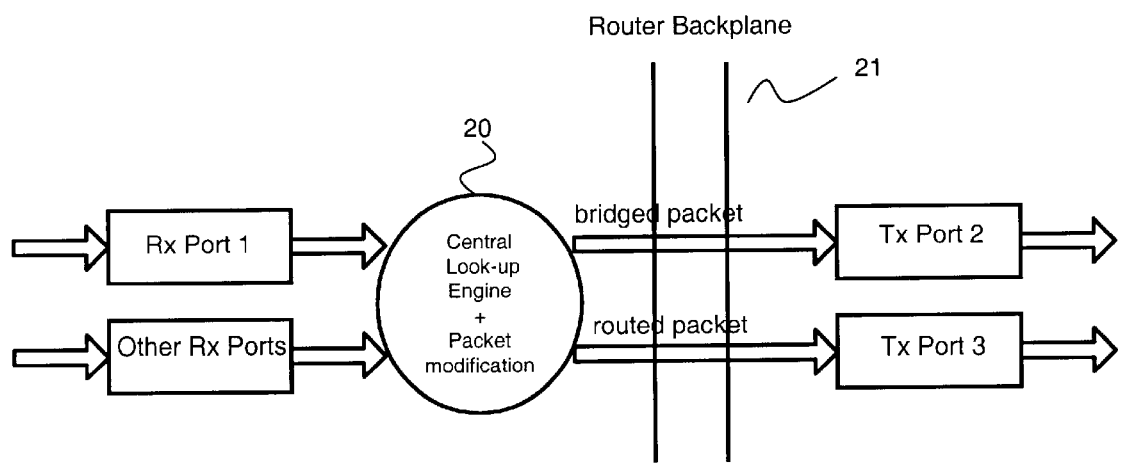
FIG. 2 is an explanatory diagram of the operation of a known form of router.

The known process is illustrated in FIG. 2 Packets received by an Rx port 1 are forwarded to the central look-up engine 20 which performs the necessary look-up in the database (not shown) and, in turn, forwards a 'bridged' packet to a transmit (Tx) port 2, assumed to be on the same subnet as receive (Rx) port 1. After modification of the packet, the engine 20 'routes' the packet to transmit port 3, on a subnet different from that for Rx port 1. Thus the packet has to be forwarded more than once across the router's backplane 21 if it requires both bridging and routing. It is intended, in relation to FIG. 2 and subsequent Figures that the blocks denoting the 'ports' include not only the physical features of the ports but also the associated signal processing circuits.

Figure 3:
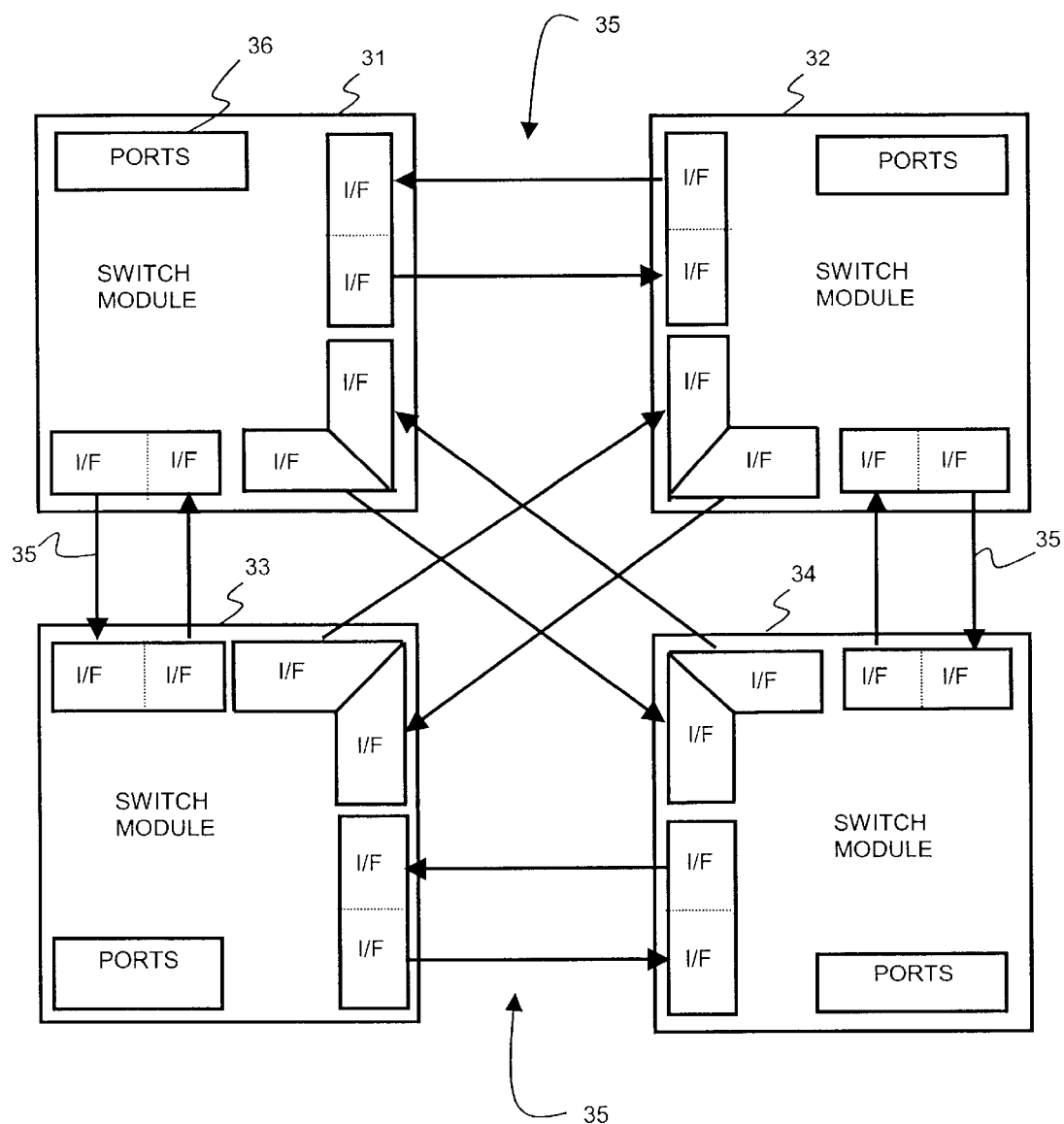
FIG. 3 is a schematic illustration of the switching fabric of a multi-chip device.

FIG. 3 shows one example of a particular switch architecture in which four similar switch modules 31, 32, 33 and 34 each have their own local ports and packet processing ASIC (not shown) and are connected to each other by transmit and receive links extending between respective pairs of interfaces (I/F). In this type of architecture, if for example the switch module 31 receives at one of its external ports 36 a multicast packet, it may need to forward the packet more than once across the links. In this architecture the various links 35 between the modules in essence constitute a backplane and it is desirable to minimise the occupancy of the backplane.

FIG. 4 schematically illustrates the basis of the present invention. In this scheme, a packet which is received by Rx port 1 is examined by the central look-up engine which, in known manner, will make the decision that determines the ports from which the packet needs to be forwarded. However, the central look-up engine 20 will not perform any address modification or consequential modification of the packet before the packet is sent across the router's backplane. Instead of the known scheme, the device includes for each transmit port processing facilities which will perform, in addition to the processing functions normally performed prior to the dispatch of the packet, the necessary modification that distinguishes bridging, and routing of packets.

For a transmit processing circuit to make a routing decision, it needs several pieces of information for each packet. One item of information is an indication from the look-up engine that the packet is an IP multicast packet which the transmit side may need to bridge or route. This indication is a control flag termed herein the 'SendToPvid Flag'. This flag may be derived from the 'associated data' for a multicast packet in the look-up database. In the present example, the flag is obtained from a flag field 'ADSend-ToPvid' which is stored in the associated data and is set by the system software if the forwarding database is to be configured to use this mode of operation. In turn, there is a network protocol (GMRP) to which system software can respond to set up IP multicast streams.

A second item of information is a control flag, herein termed 'ipModify' which indicates whether modification of the packet (for routing purposes) is allowed. As will become apparent, it is used in conjunction with the other control flag to prevent the modification of non-IP non-multicast packets, and to allow modification of non-IP multicast packets.

The generations of the flags in a practical embodiment, taking into account various forms of traffic and selectable inhibitions, is described later with reference to FIG. 10.

A third item of information is an identification of the VLAN or subnet from which the packet was received. Such an identification can be determined by the port that receives that packet or may already be indicated in the packet by means of a known form of tag, the 802.1Q tag. The identification of the source VLAN is conveyed to the transmit side with each packet. If the packet is not already tagged it may be tagged with the source VLAN identification by means of the process described in the published patent application GB-2343816.

A fourth item of information does not require any transmission of information with the packet but is the default VLAN identification for a particular port. This VLAN identification is fixed for each port. If a particular port is a member of only one VLAN, then the default VLAN is the VLAN to which that port is connected. If, as described later, a port is part of a multiplicity of VLANs, then one of them most be chosen as the default VLAN for that port. The default VLAN identification may be stored in a register accessible to the transmit port processor.

The task of modification of the packet required for routing may be transferred from the central engine to the transmit port by means of the information indicated above. The transmit port will 'route' the packets, that is to say to apply the source MAC address appropriate for that port, decrement the 'time to live' and recompute the check sum if the relevant flags are set and the source VLAN or more generally the 'segment identification' within the packet corresponds to the default VLAN or segment for that port. Otherwise the packet will not be modified and will be 'bridged' that is to say forwarded unchanged by the port.

As will be explained, the specific embodiment is designed to handle, in addition to IP multicast traffic which may be routed or bridged, IP unicast traffic, 'non-IP' multicast traffic and traffic that unconditionally must be bridged. The four types of traffic are distinguished by the four different combinations of the 'ipModify' flag and the 'SendToPvid' flag. This is shown in FIG. 6.

Figure 5:
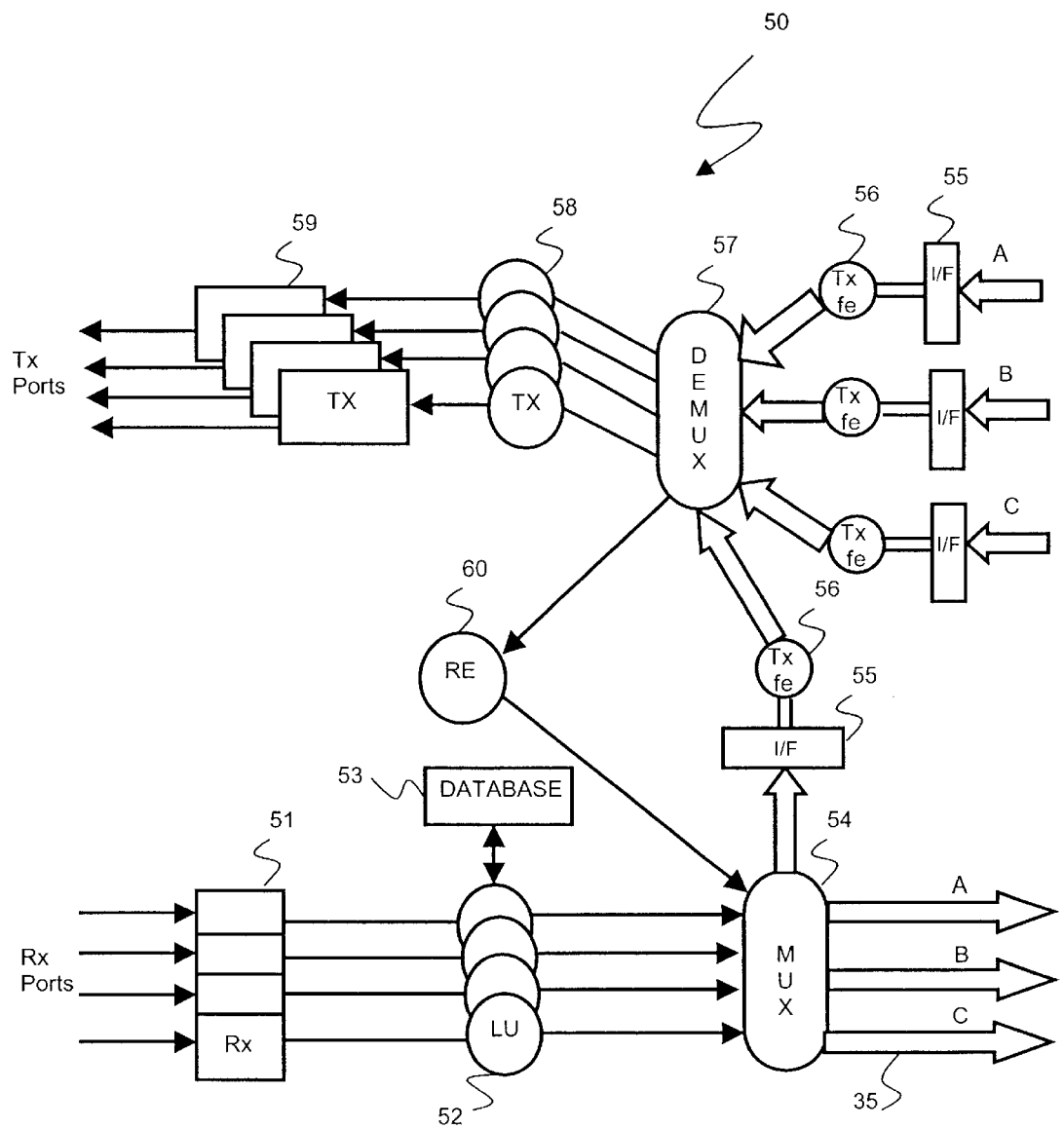
FIG. 5 illustrates schematically a modular unit within a switching device such as shown in FIG. 3.

FIG. 5 illustrates in greater detail one of the modules or sub-units shown in FIG. 3. This module is, with the exception of a modification of the actions of look-up engines and the insertion of a transmit side processing block in the processor for each transmit port, in generally known form.

It may be emiphasised that the implementation of the invention is not limited to this module or form, it may be incorporated in standard commercially available routers.

Packets are received by the module 50 at any of a multiplicity of receive ports 51. They will leave either this module or tile modules connected thereto by respective transmit ports, shown for module 50 by the transmit ports 59. In practical devices the receive ports and transmit ports are matched one to one in a respective single bidirectional port.

Packets received at the receive ports 51 are temporarily stored in memory (not shown) and made the subject of a look-up by means of a well known look-up and forwarding, engine 52 which has recourse to a forwarding database 53. Such a database may be accessed in response to the IP address data and in particular the destination data. A variety of means of performing, the look-up are known. Entries in the database match destination address data with the forwarding information such as the port number and a variety of associated data. In response to the forwarding data obtained by way of the look-up, packets will be directed to the relevant output port or, in the case of a multicast packet, to one or usually to more than one transmit port. It is assumed that the engine 52 and database 53 can support both 'layer 2' (media access control address) and 'layer 3' (protocol address) look-ups. These may be software or hardware controlled. One example is described in GB patent number 2337674.

In the present embodiment, since some packets may be sent to different modules, packets, actually retrieved from memory but shown for the sake of simplicity as coming from the look-up engines 52, precede to a multiplexer 54 where they may be sent on high speed links 35 to the other units or may, so far as they are directed to the Tx ports 59, by way of an interface 55, and a transmit forwarding engine 56 which directs the packets from the respective interface to the respective ports by way of a demultiplexer 57. Packets which have been the subject of look-ups and other modules and are intended for transmission from any of the transmit ports 59 arrive by way of high speed links 35 coupled to interfaces 55, transmit forwarding engines 56 and respective inputs of the demultiplexer 57, which is coupled to the transmit processing blocks (Tx) 58 of which there is a respective one for each port 59.

FIG. 5 includes a packet replication engine 60 which may be in known form. Its significance is described later with reference to FIG. 9.

As previously indicated, the determination of which ports are required to forward a packet is made, in accordance with known practice, by the look-up engine 52. However, again as previously explained the packets are required to be modified or not according as they are routed or bridged. In the former case, they require a new source MAC address, and (in this embodiment) be subject to decrementing of their respective time to live values and be subject to a recomputation of their respective check sum.

Whether the packet should be routed or bridged depends on (among other things) whether the source and destination of the packet are on the same network segment, namely the same sub-net or VLAN.

The control flags are employed by the transmit side processing blocks 58 for each port as will be described. The flags and their significance are summarised for convenience in FIG. 6.

If the 'ipModify' flag and the 'SendToPvid' flag are both 'clear' (zero), the action taken by the transmit side processing block will be that the packet should be bridged. If the 'ipModify' flag is clear but the 'SendToPvid' flag is 'set' (1), the packet will be bridged on to the default VLAN for the port. This mode of operation is not directly relevant to the present invention but is used for routing non-IP multicast traffic.

If the 'ipModify' flag is 'set' but the 'SendToPvid' flag is 'clear', the packet will be routed on to the destination VLAN supplied by the look-up engine. This mode is likewise not directly relevant to the present invention but is included because the mode is necessary for routing IP unicast traffic.

Finally, if both flags are set the respective transmit processor 58 must decide if the packet should be routed or bridged. If the packet is routed it will be routed on to the default VLAN for the port. It is this decision which has been transferred from the look-up and forwarding engine 52 to the transmit side.

There is a variety of means of inserting flags into a standard packet. One such method is shown in patent publication GB-2343816, which relies on the fact that the standard VLAN tag header, known as the 802.1q tag header, for a packet is redundant while a packet remains within a device. The aforementioned application describes a method of temporarily replacing the VLAN tag header with user information. The method may be used for the 'ipModify' and 'SendToPvid' flags.

Figure 7:
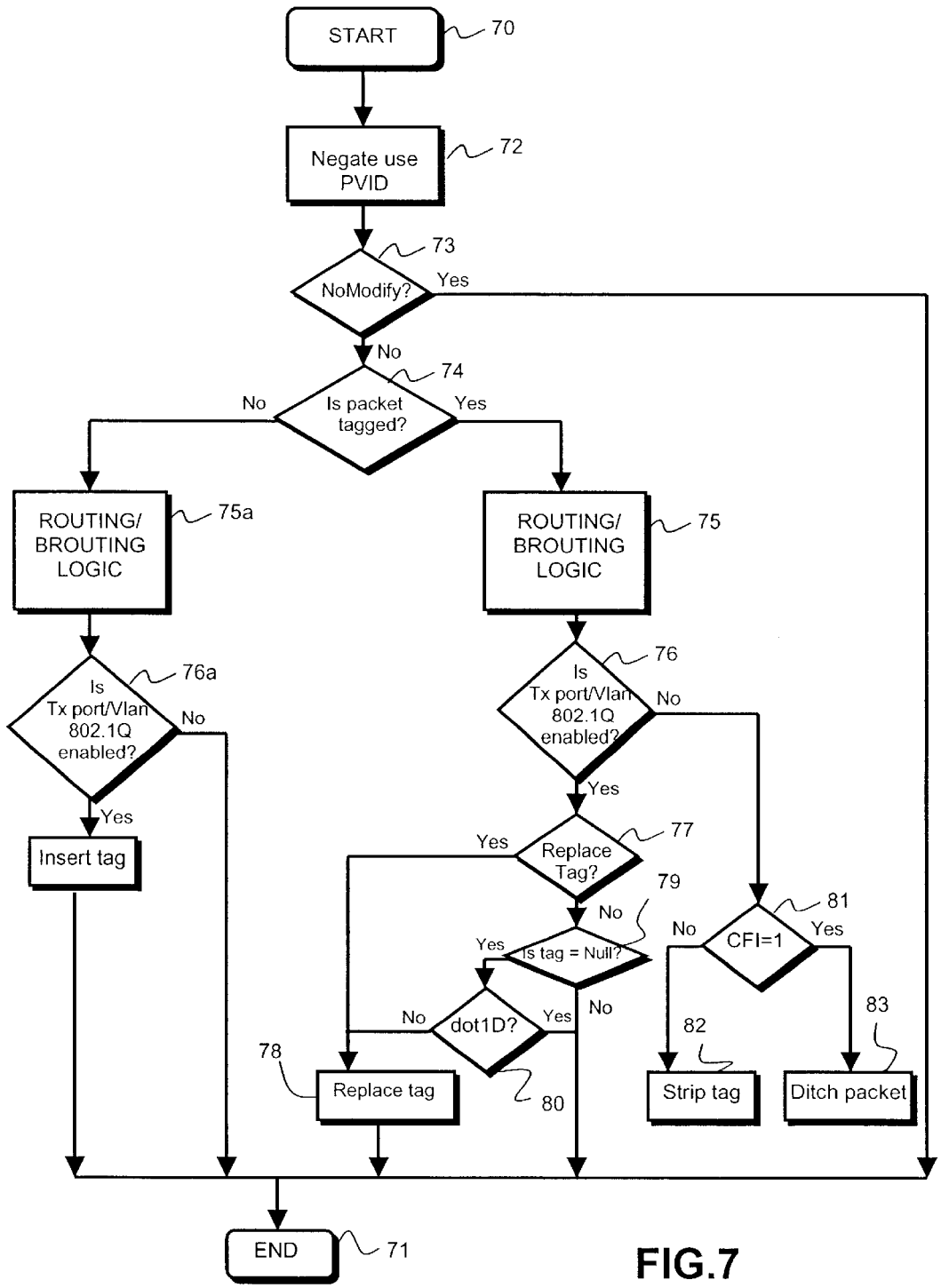
FIG. 7 illustrates the general operation of a transmit processor according to the invention.
Figure 8:
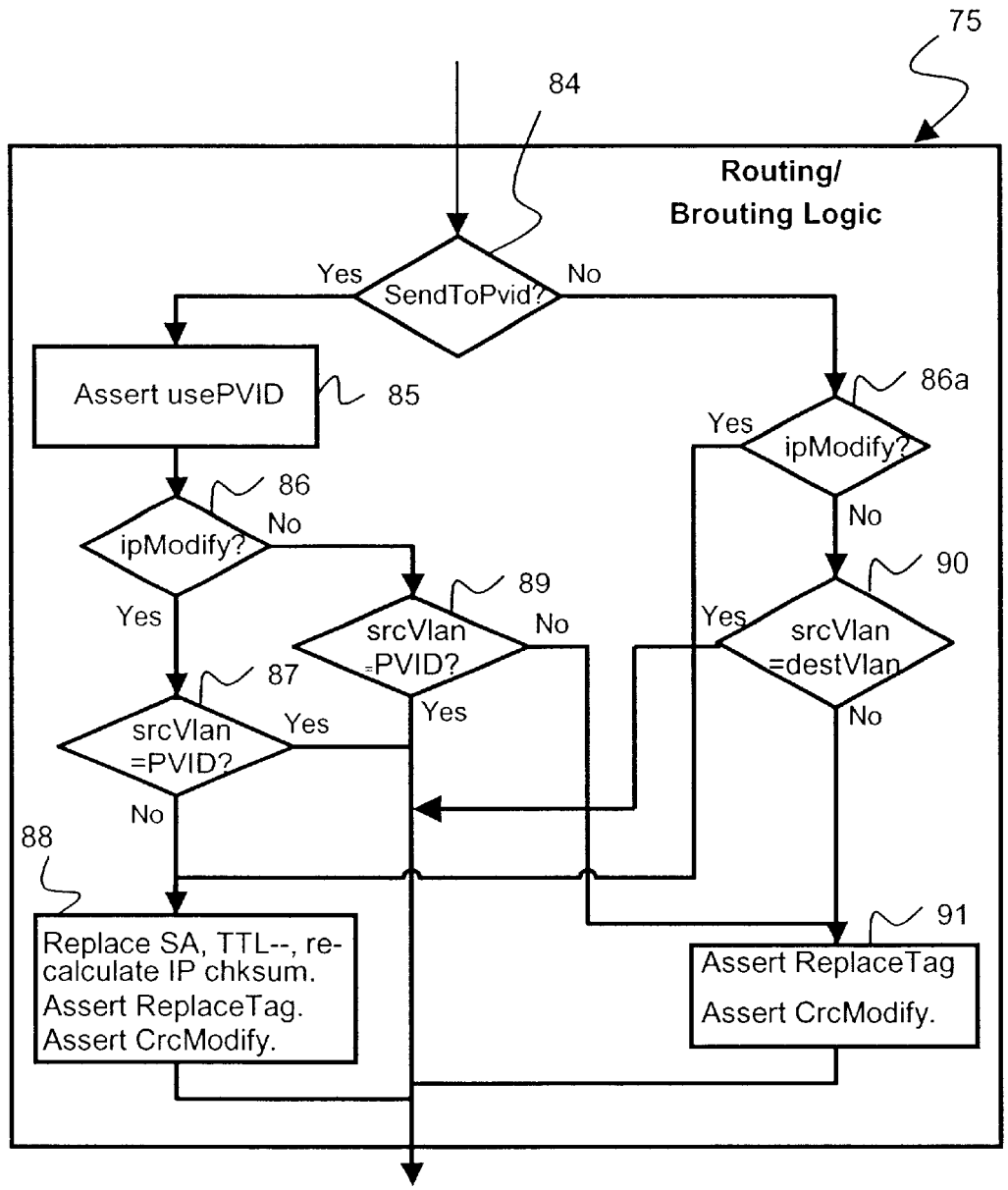
FIG. 8 illustrates a detail of the operation of the transmit processor in accordance with the invention.

FIGS. 7 and 8 illustrate the processing performed by the transmit processors 58 in accordance with the invention. By way of introduction, it should be remarked that they are more complex than is apparently necessary because a practical system makes provision for packets which are in accordance with non-IP protocols. It is not possible to route packets of this nature between different VLANs. Therefore the activity known as 'brouting' is used to allow packets which have non-IP protocols to cross over between VLANs. For example, in FIG. 1, if a non-IP packet has to be forwarded from Port 1 VLAN 1 to Port 2 VLAN 2 and Port 3 VLAN 3, the packet will have to be bridged to VLAN 2 and VLAN 3. In this case the SendToPvid bit will be set by the look-up engine and ipModify tag will be clear. The transmit side will the bridge the packet onto these VLANs, modifying the VLAN tag on the packets if necessary The process in FIG. 7 proceeds from a 'start' stage 70, when a packet is received by the transmit side process to and 'end' stage 71 when the packet is ready for forwarding from the respective port. The important parts of FIG. 7 is in the block shown at 75, to be described with reference to FIG. 8, but the processing stages shown explicitly in FIG. 7 are shown for completeness.

The process in FIG. 7 after the start stage 70 negates a 'use Pvid'. The next stage 73 is a determination whether the packet will not be modified Although these two stages are not necessary for or the present invention they are included for practical convenience. 'UsePVID' is a flag which is passed to the logic that processes the 802.1q tag on a packet. If 'UsePVID' is asserted the logic will use the default VLAN for the port. If it is negated the destination VLAN (obtained from the look-up engine) will be used. The flag is negated at the start of the process and only asserted (if appropriate) at stage 85 (q.v.).

A 'NoModify' flag when asserted (stage 73) ensures that the whole process is by-passed. Such a flat is employed by the system software when a packet that must not be modified is to be transmitted, particularly from a 'management' port. 'Yes' in response to the interrogation marks the end of the transmit side processing. If the response is 'No' there has to be an examination (stage 74) of the packet to determine whether it has an 802.1q tag.

Non-IP multicast traffic need not be tagged and such traffic will be handled by the left hand section 75a of the routing/brouting logic but may be tagged so as to be handled by the right-hand section. This logic will be described in conjunction with FIG. 8. The packet may or may not be modified but in any event on emerging from routing/brouting logic 75a is subject to an interrogation stage 76a determining whether the transmit port is enabled to provide a VLAN tag, which may then be inserted before the packet is forwarded, this being denoted by the stage 'END'.

If the packet is tagged (stage 74), the further processing proceeds by way of the routing/brouting logic 75. Subsequent to that there is some processing, not directly relevant to the present invention, for determining whether to replace a VLAN header tag or in some cases (particularly where the CFI bit equals unity) to discard the packet.

More particularly, stage 76 (corresponding to stage 76a) determines whether the port is enabled to provide a VLAN tag in accordance with IEEE Standard 802.1Q. If it is, stages 77 to 80 determine whether a tag is already present and accordingly whether to insert such a tag. If the port is not enabled to provide an '802.1Q' tag, stages 81 to 83 include an examination of the CFI bit to determine whether the tag should be removed or the packet should be discarded. The CFI bit is part of the 802.1q tag, and indicates when set that the packet is in 'token ring' format. Since at stage 81 the tag is to be stripped from the packet, and the CPI bit lost, the packet is, for safety, discarded to prevent the next switch from treating the packet (erroneously) as a normal 'ethernet' packet.

FIG. 8 illustrates the routing,/brouting logic 75.

There is first a determination (stage 84) of whether the 'SendToPvid' tag is set (1) or not. If that tag is set to "1", the 'use Pvid' is asserted (stage 85). There is then an examination (stage 86) of the 'ipModify?' flag. If this is '0' there is a determination (stage 89) whether the source VLAN equals the default VLAN. If the source VLAN does not equal the default VLAN then at stage 91 'Replace Tag' and 'CRC-Modify' will be asserted. The recalculation of the CRC field preferably occurs just before the packet leaves the relevant port.

If the ipModify tag is asserted, there is an examination (stage 87) whether the source VLAN is equal to the default VLAN. If it is not, then the packet must be 'routed' and the next stage 88 indicates the modification of the packet by replacement of the source address, the decrementing of the TTL sum, the recalculation of the IP check sum. There is an assertion of a 'replace tag' flag (see stage 77) and an assertion of an CRC Modify flag.

If however the 'SendToPvid' flag, is not set, then the next stage is the examination (stage 86a) of the 'ipModify' flag. It that is asserted, then one proceeds straight to the stage 88. If it is not asserted then there has to be a determination whether the source VLAN, equals the destination VLAN (stage 90). If the answer is negative, then there has to be an assertion of the 'replace tag' and the 'CRC Modify' flag.

The left-hand routing/brouting logic 75a resembles the logic 75 shown in FIG. 8 except that a determination whether the source VLAN equals the destination VLAN will be omitted. Further, if the response to the ipModify interrogation after the assertion of the use Pvid bit is negative, then there is no determination whether the source VLAN equals the default VLAN. Thus logic 75a will omit stages 89, 90 and 91 but otherwise resemble logic 75.

Figure 9:
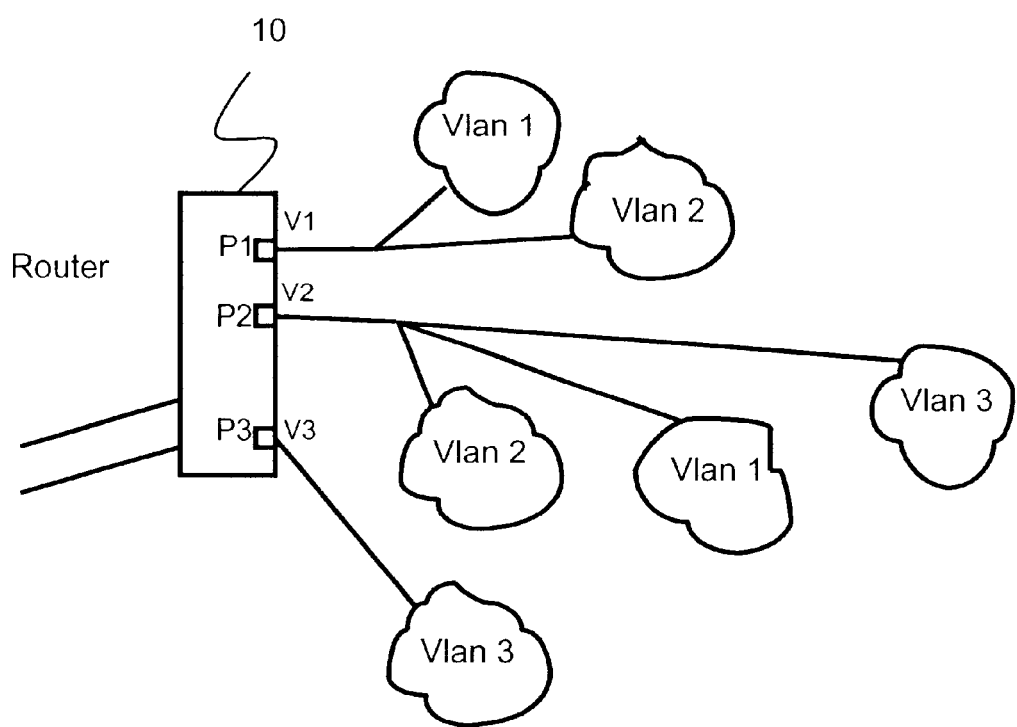
FIG. 9 illustrates pat of a network in which the present invention is useful.

In order to cope with multiple VLANs connected to a port 2 as shown in FIG. 9, it is possible to employ a replication engine. The replication engine 60 is responsible for forwarding the packet to all other VLANs, other than the default VLAN of a port. This helps to alleviate the replication engine of some of the work that it may have to do.

As an example an IP multicast packet is received on P1 from VLAN 2. The router 10 has to forward this packet to Port 1 VLAN 1, Port 2 VLAN 2 and VLAN 3 and Port 3 VLAN 3. A look-up will first forward the packet once to Port 1, Port 2, Port 3 and the replication engine with the SendToPvid flag asserted. This will result in the packet being routed out Port 1 on VLAN 1, bridged out Port 2 on VLAN 2 and routed out Port 3 VLAN 3. The replication engine then has tile task of routing the packet to Port 2 VLAN 3 only. The packet only has to cross the router backplane only twice.

Without the 'SendToPvid' flag the packet would have been bridged first to Port 2 VLAN 2, then the replication engine would forward the packet to Port 1 VLAN 1 and then to Ports 2 and 3 VLAN 3.

As has been mentioned earlier, specifically in connection with FIG. 5, the general organisation of the central look-up engine and the database follow known lines. The practical difference from known systems lies in the development of the aforementioned flags ipModify and SendToPvid, which are sent with a received packet from any temporary or buffer store across the routing switch to the ports selected by the look-up engine, at the transmit side, and specifically the processing logic associated with each respective port the flags are employed in conjunction with the identification of the default segment or VLAN to enable the transmit port processing to determine whether the packet should be sent out of that port and changed or with the required modification.

FIG. 10 is a table showing the generation of the two control flags 'ipModify' and 'SendToPvid' in accordance with the information obtained partly from the look-up in the database and partly in response to signals obtained from decoding the packets. For the sake of completeness, FIG. 10 includes a variety of circumstances which are not directly relevant to the invention, that is to say those handling packets of other protocols or packets where there is an unconditional indication from the receive side decode.

FIG. 10 has twelve columns of which the first nine represent possible indications obtained from the receive side decode or the look-up. Most of these are not directly relevant to the improvement envisaged by the present invention, which is fundamentally concerned with the routine of IP multicast packets.

The signal 'bride', in the first column of FIG. 10, is a signal from a receive decode (e.g. performed in the ASIC for a receive port) representing an unconditional instruction that the look-up engine should perform a 'layer 2' look-up for the packet. It is therefore of no great consequence what the other values in the columns may be, in all cases both the ipModify and the SendToPvid flags will be cleared to zero.

The 'exception' is a 1-bit signal from the receive decode that the look-up engine should access a reserved location in memory to determine the destination or destinations of a packet. The 'exception' signal is provided by packets which conform to IGMP (internet general management protocol). ARP (address resolution protocol), OSPF (Open Shortest Path First) and packets of other special protocols. In these cases also, the ipModify and SendToPvid flags will both be clear.

The signal 'broute' is a signal from the receive decode that the look-up engine should perform a layer 2 look-up for the packet. The signal 'route' is a signal obtained from the receiver decode that the look-up engine should perform a layer 3 look-up for the packet. It indicates that a packet is an IP packet, it has a MAC destination address equal to the router's address and that routing is enabled on the interface by which the packet was received.

The signal IPMC represents an internet protocol multicast packet which is of primary concern in the present invention. This is obtained from the packet.

It will be noted that the signal 'broute', in the third column, is not set for any IP multicast packet. The 'broute' signal will be set for non-IP packets and indicates that brouting is enabled on the interface by which the packet was received. It indicates that the look-up engine should perform a 'layer 2' look-up using a database separate from that used for normal 'layer 2' look-ups.

For non-IP multicast packets, represented by the third and fourth groups of eight rows in FIG. 10, there may be the setting of the SendToPvid flag if the 'broute' signal is set and there may be setting of the ipModify flag if the route bit is set The signal 'TTLEq One' is only set for internet protocol multicast frames whose 'time to live' is unity. Such packets will have ipModify and SendToPvid both 'clear', because these packets must be bridged.

The signal 'AD BridgeOnly' is obtained from the associated data in the look-up database for the packet. It is a selectively controllable bit and may be set for internet protocol multicast packets or for internet protocol unicast packets that the user does not wish to have modified by the processor. Thus where AD BridgeOnly is set, ipModify and SendToPvid are both clear.

The signal AD SendToPvid is a bit from the associated data in the look-up database for the packet as previously explained.

SrcVID=destVID is obtained if the source VLAN equals the destination VLAN. This is for internet protocol unicast packets that have to be routed. The destination VLAN will be obtained from the associated data block in the entry for the destination of the packet.

'Bridge Frame Only' in the tenth column is the logical union of AD Bridge Only and TTL=1.

What is claimed is:

1. A network router comprising:
a multiplicity of transmit ports for forwarding packets from said router;
transmit processors associated with said transmit ports; and
a look-up and forwarding engine;
wherein said look-up and forwarding engine is operative in response to the reception of an internet protocol multicast packet by said router to direct the multicast packet to a multiplicity of said transmit ports which may or may not be connected to the source network segment from which the multicast packet was received by the router; and
wherein each transmit port is associated with a predetermined default network segment and said look-up and forwarding engine directs the multicast packet with an identification of the source network segment and control flags which enable said transmit processors associated with said transmit ports to determine by comparison of the respective network segment and the source network segment whether the packet is bridged from a respective port or routed, with relevant modification of the packet, from that port.

2. A router according to claim 1 wherein said relevant modification includes a modification of a source media access control address in the packet.

3. A router according to claim 2 wherein the said relevant modification includes a recomputation of a checksum.

4. A router according to claim 1 wherein the control flags comprises a first flag which can be set to allow the relevant modification and a second flag which can be set to allow the comparison between the source segment and the predetermined default segment.

5. A network router comprising:
a multiplicity of ports for connection to network segments of a communication network, each port being associated with a respective default network segment and each having a respective transmit packet processor, each respective transmit packet processor being operative in response to control flags in a packet to determine whether said packet should be bridged to said respective default network segment or routed to a destination network segment; and
a look-up and forwarding engine operative in response to the reception from a source network segment of an internet protocol multicast packet to direct said packet to a plurality of said ports with an identification of said source network segment and said control flags.

6. A router according to claim 5 wherein the control flags comprises a first flag for allowing the modification for a source media access control address in said packet and a second flag for allowing a comparison between the source network segment and the respective default network segment.

7. A method of operating a network router which has a look-up and forwarding engine and a multiplicity of ports connected to network segments of a packet-based communication network, the method comprising the steps of:
receiving at one of said ports from a source network segment an internet protocol multicast packet;
performing a look-up to determine a plurality of ports to which said packet should be sent;
providing said packet with an identification of the source network segment and control flags; and
for each of said ports in said plurality of ports, responding to said control flags to determine whether the packet is bridged from the respective port or routed from that port.

8. A method as in claim 7 wherein said flags comprise a first flag which indicates whether modification of the packet is allowed for the purpose of routing and a second flag which allows a comparison of said source network segment and a default segment associated with the respective port.

9. A method as in claim 7 further comprising for each of the ports in said plurality of ports, responding to said flags to effect selective modification of a source media access control address in said packet.

10. A network router for use in a network having a plurality of network segments, comprising:
a multiplicity of ports for the reception and transmission of data packets, each port being associated with a default network segment;
a look-up and forwarding engine operative in response to the reception of a multicast packet to direct said packet to a plurality of said ports;
a backplane for the conveyance of packets between said ports;
a respective transmit packet processor associated with each of said multiplicity of ports;
wherein said look-up and forwarding engine sends said multicast packet over said backplane with an identification of a source network segment from which said packet was received and with control flags; and said respective transmit packet processor associated with each one of said plurality of ports responds to said flags on receipt of said multicast packet from said backplane to determine by comparison of the source network segment and the respective default network segment whether said multicast packet is bridged or routed from that one port.

11. A network router as in claim 10 wherein said control flags comprise a first and a second control flag and wherein:

(a) when both said control flags are cleared, said respective transmit packet processor determines that said multicast packet will be bridged from said one port;

(b) when said first control flag is set and said second control flag is cleared, said respective transmit packet processor determines that said multicast packet will be routed from said one port onto a network segment supplied by said lookup engine and said respective transmit packet processor determines that said multicast packet will be bridged onto a default network segment from said one port;

(c) when said first control flag is cleared and said second control flag is set, said respective transmit packet processor determines that said multicast packet will be bridged onto a default network segment from said one port; and (d) when both said first and second control flags are set, said respective transmit packet processor determines that said multicast packet will be routed from said port onto a default network segment associated with said one port.

12. A network router for use in a network having a plurality of network segments, comprising:

a multiplicity of ports for the reception and transmission of internet protocol data packets, each port being associated with a respective default network segment;

a look-up and forwarding engine operative in response to the reception of a multicast packet to direct said multicast packet to a plurality of said ports;

a backplane for the conveyance of packets between said ports;

a respective packet processor associated with each of said multiplicity of ports;

wherein a look-up and forwarding engine sends said multicast packet over said backplane to said plurality of ports with an identification of a source network segment from which said multicast packet was received and with control flags, said control flags comprising a first flag for allowing the modification for a source media access control address in said multicast packet and a second flag for allowing a comparison between said source network segment and a respective default network segment; and said packet processor responds to said flags on receipt of said multicast packet from said backplane to determine by comparison of the source network segment and the respective default network segment whether said multicast packet is bridged or routed from that one port.

13. A network router for use in a network having a plurality of network segments, comprising:

a plurality of switch modules each having (i) a respective plurality of ports for the reception and/or transmission of internet protocol data packets, each port being associated with a respective default network segment, (ii) a respective look-up and forwarding engine operative in response to the reception of a multicast packet to direct said packet to a multiplicity of said ports; and (iii) at least one transmit processor for said respective plurality of ports; and a multiplicity of internal data links connecting said switch modules, said internal data links constituting a backplane;

wherein each respective look-up and forwarding engine on receipt of a multicast packet that requires forwarding from at least one port of a destination switch module other than the switch module that has received said multicast packet sends said multicast packet over said backplane with an identification of a source network segment from which said packet was received and with control flags; and said respective packet processor associated with said destination switch module responds to said flags to determine by comparison of the source network segment and the respective default network segment whether said multicast packet is bridged or routed from said one port.

14. A network router as in claim 13 wherein said control flags comprise a first and a second control flag and wherein:

when both said control flags are cleared, said respective transmit packet processor determines that said multicast packet will be bridged from said one port;

(b) when said first control flag is set and said second control flag is cleared, said respective transmit packet processor determines that said multicast packet will be routed from said one port onto a network segment supplied by said lookup engine and said respective transmit packet processor determines that said multicast packet will be bridged onto a default network segment from said one port;

(c) when said first control flag is cleared and said second control flag is set, said respective transmit packet processor determines that said multicast packet will be bridged onto a default network segment from said one port; and (d) when both said first and second control flags are set, said respective transmit packet processor determines that said multicast packet will be routed from said port onto a default network segment associated with said one port.

15. A network router for use in a network having a plurality of network segments, comprising:

a plurality of switch modules each having (i) a respective plurality of ports for the reception and/or transmission of internet protocol data packets, each port being associated with a default network segment, (ii) at least one respective look-up and forwarding engine operative in response to the reception of a multicast packet to direct said packet to a multiplicity of said ports and (iii) a respective transmit processor for each of the ports of the switch module; and a multiplicity of internal data links connecting said switch modules, said internal data links constituting a backplane;

wherein (a) each respective look-up and forwarding engine on receipt of a multicast packet that requires forwarding from at least one port of a destination switch module other than the switch module that has received said multicast packet sends said multicast packet over a respective one of said internal data links with an identification of a source network segment from which said multicast packet was received and with control flags; and (b) a transmit processor on said destination switch module responds to said flags to determine by comparison of the source network segment and said respective default network segment whether said multicast packet is bridged or routed from said one port.

16. A network router as in claim 15 wherein said control flags comprise a first flag for allowing the modification by said transmit processor of a source media access control address in said multicast packet and a second flag for allowing said comparison between said source network segment and said respective default network segment.

17. A network router for use in a network having a plurality of network segments, comprising:

a multiplicity of ports for the reception and transmission of internet protocol data packets having media access control address data and network address data;

a backplane for the conveyance of packets across the router;

a look-up and forwarding engine operative in response to the reception of a multicast packet to determine a plurality of said ports from which the multicast packet is to be forwarded and to send said multicast packet to said plurality of ports by way of said backplane; and a transmit processor operative to process said multicast packet after it has traversed said backplane but before it is forwarded from a respective port;

wherein said lookup and forwarding engine sends said multicast packet over said backplane without modification of address data therein, with an indication of a network segment from which said multicast packet has been received and with control flags enabling a determination by said transmit processor whether said multicast packet should be bridged or routed from said respective port;

said transmit processor responds to said control flags to cause a comparison of said network segment with a network segment associated with said respective port and thereby to determine whether said multicast packet is bridged or routed from said respective port; and said transmit processor modifies said multicast packet in accordance with routing requirements in the event that said multicast packet is routed from said respective port.

18. A network router as in claim 17 wherein said control flags comprise a first flag for allowing the modification by said transmit processor of a source media access control address in said multicast packet and a second flag for allowing said comparison between said source network segment and a respective default network segment.

19. A network router as in claim 17 and comprising a plurality of switch modules each including a group of said ports and a respective lookup and forwarding engine, said switch modules being connected by links internal to the router and constituting said backplane.

* * * * *